(12) United States Patent
Bradley et al.

(10) Patent No.: US 9,704,506 B2
(45) Date of Patent: Jul. 11, 2017

(54) HARMONIC FEATURE PROCESSING FOR REDUCING NOISE

(71) Applicant: KNUEDGE, INC., San Diego, CA (US)

(72) Inventors: David C. Bradley, La Jolla, CA (US); Yao Huang Morin, San Diego, CA (US)

(73) Assignee: KNUEDGE, INC., San Diego, CA (US)

( * ) Notice: Subject to any disclaimer, the term of this patent is extended or adjusted under 35 U.S.C. 154(b) by 0 days.

(21) Appl. No.: 15/401,608

(22) Filed: Jan. 9, 2017

(65) Prior Publication Data

US 2017/0148465 A1    May 25, 2017

Related U.S. Application Data

(63) Continuation of application No. 15/016,801, filed on Feb. 5, 2016, now Pat. No. 9,576,589.

(60) Provisional application No. 62/112,806, filed on Feb. 6, 2015, provisional application No. 62/112,824, filed on Feb. 6, 2015.

(51) Int. Cl.
| | |
|---|---|
| *G10L 21/00* | (2013.01) |
| *G10L 21/038* | (2013.01) |
| *G10L 21/02* | (2013.01) |
| *G10L 25/18* | (2013.01) |
| *G10L 21/0388* | (2013.01) |
| *G10L 21/0264* | (2013.01) |
| *G10L 21/0232* | (2013.01) |
| *G10L 17/02* | (2013.01) |
| *G10L 15/02* | (2006.01) |

(52) U.S. Cl.
CPC ........ *G10L 21/038* (2013.01); *G10L 21/0205* (2013.01); *G10L 21/0232* (2013.01); *G10L 21/0264* (2013.01); *G10L 21/0388* (2013.01); *G10L 25/18* (2013.01); *G10L 15/02* (2013.01); *G10L 17/02* (2013.01)

(58) Field of Classification Search
CPC .......................... G10L 21/038; G10L 21/0232
USPC .............................. 704/226, 223, 500, 200.1
See application file for complete search history.

(56) References Cited

U.S. PATENT DOCUMENTS

| | | | |
|---|---|---|---|
| 6,772,117 B1 * | 8/2004 | Laurila ................... | G10L 15/20 704/233 |
| 7,373,293 B2 * | 5/2008 | Chang ................... | G10L 19/032 704/200.1 |

(Continued)

*Primary Examiner* — Shaun Roberts
(74) *Attorney, Agent, or Firm* — Pierce Atwood LLP

(57) ABSTRACT

Devices, systems and methods are disclosed for reducing noise in input data by performing a hysteresis operation followed by a lateral excitation smoothing operation. For example, an audio signal may be represented as a sequence of feature vectors. A row of the sequence of feature vectors may, for example, be associated with the same harmonic of the audio signal at different points in time. To determine portions of the row that correspond to the harmonic being present, the system may compare an amplitude to a low threshold and a high threshold and select a series of data points that are above the low threshold and include at least one data point above the high threshold. The system may iteratively perform a spreading technique, spreading a center value of a center data point in a kernel to neighboring data points in the kernel, to further reduce noise.

20 Claims, 15 Drawing Sheets

(56) References Cited

U.S. PATENT DOCUMENTS

| | | | | |
|---|---|---|---|---|
| 7,454,327 B1* | 11/2008 | Neubauer | ............ | G10L 19/018 375/146 |
| 8,804,973 B2* | 8/2014 | Hirohata | ................ | G10L 25/78 361/300 |
| 2004/0044520 A1* | 3/2004 | Chen | .................. | G10L 19/0017 704/200.1 |
| 2007/0016427 A1* | 1/2007 | Thumpudi | ............ | G10L 19/035 704/500 |
| 2010/0094637 A1* | 4/2010 | Vinton | ................ | G10L 19/032 704/500 |

* cited by examiner

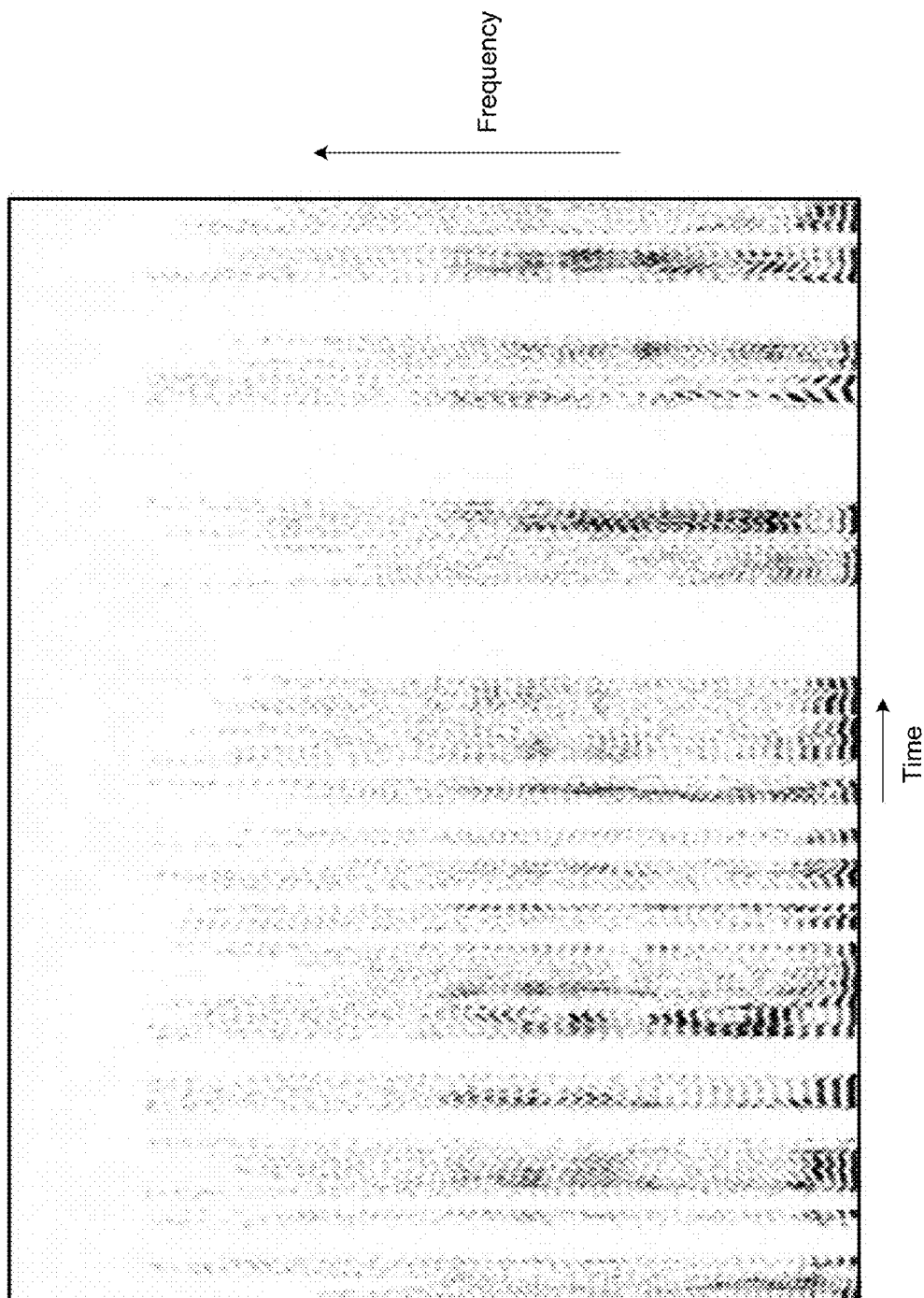

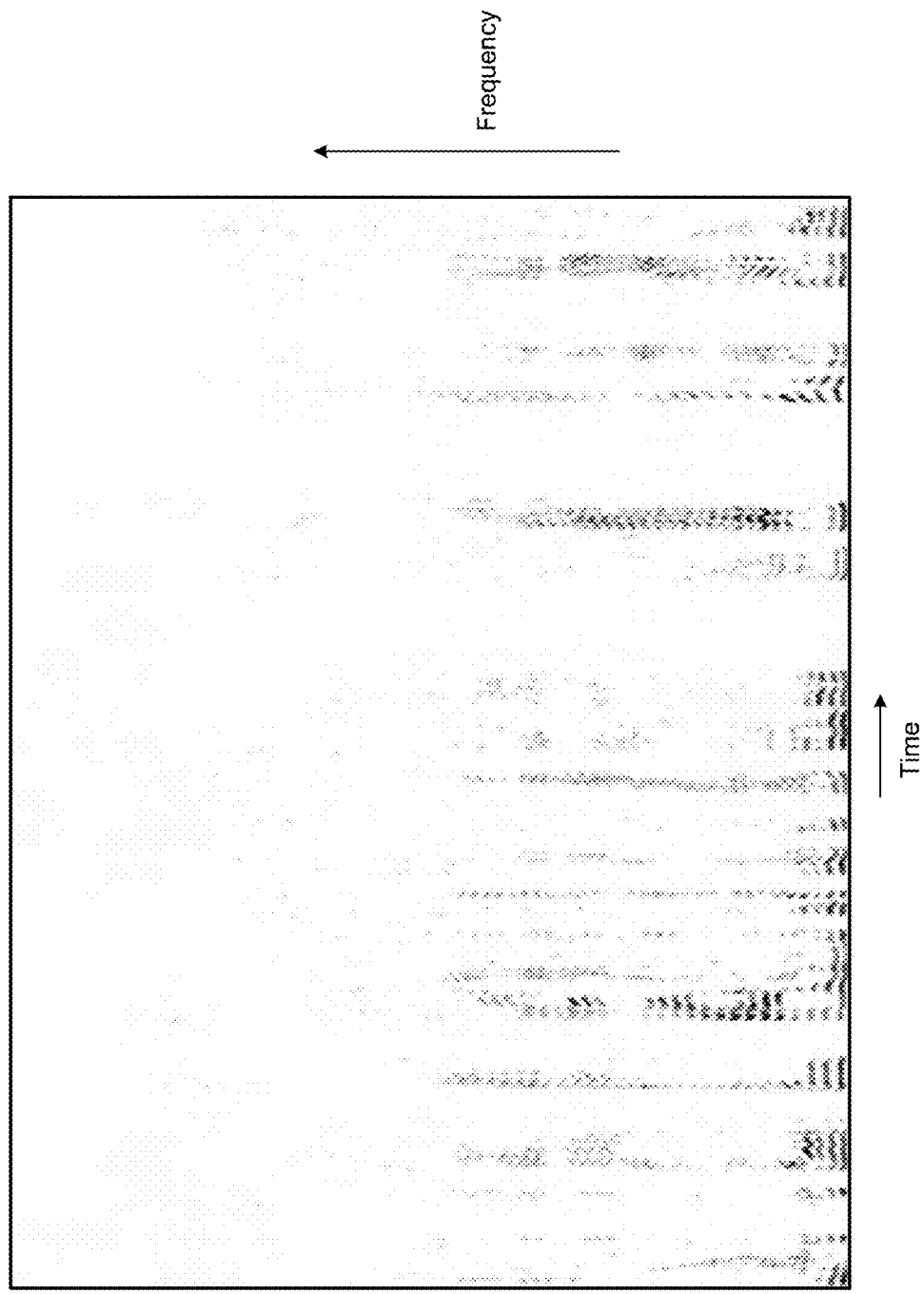

Input Feature Matrix
600

Output Feature Matrix
650

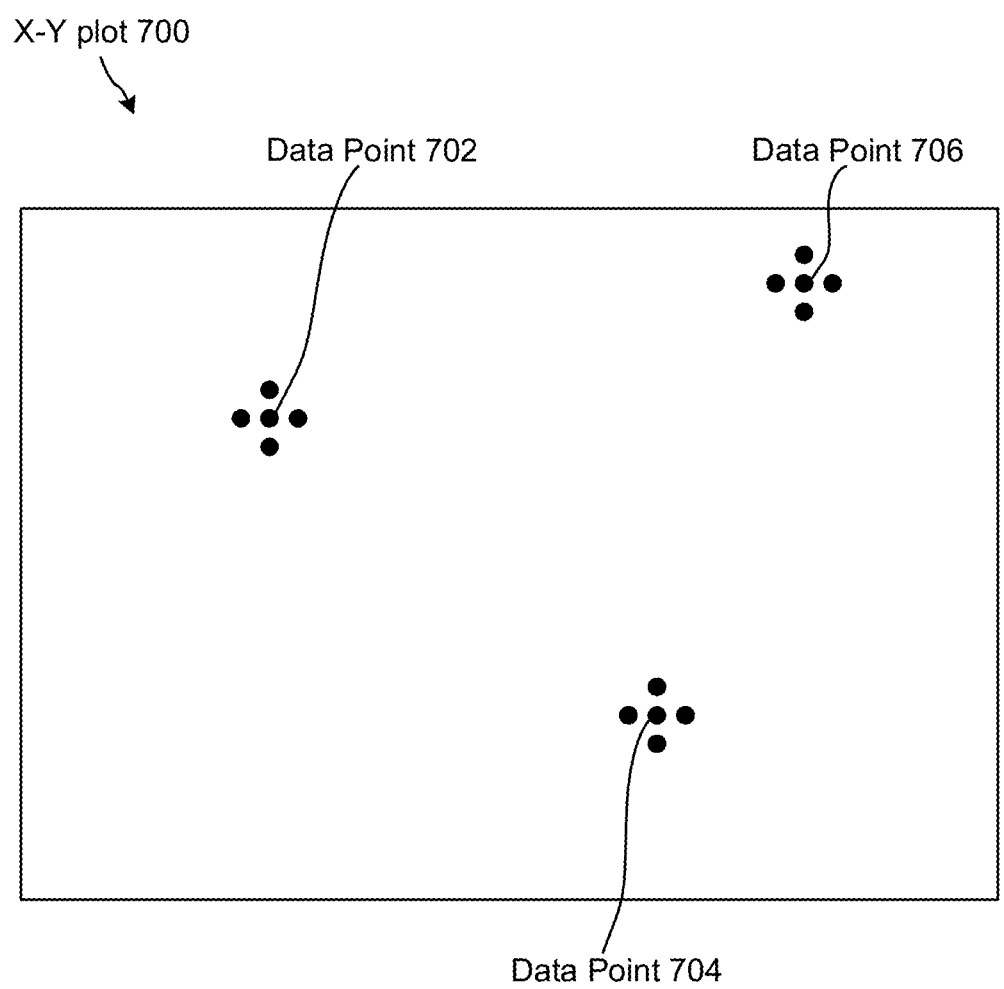

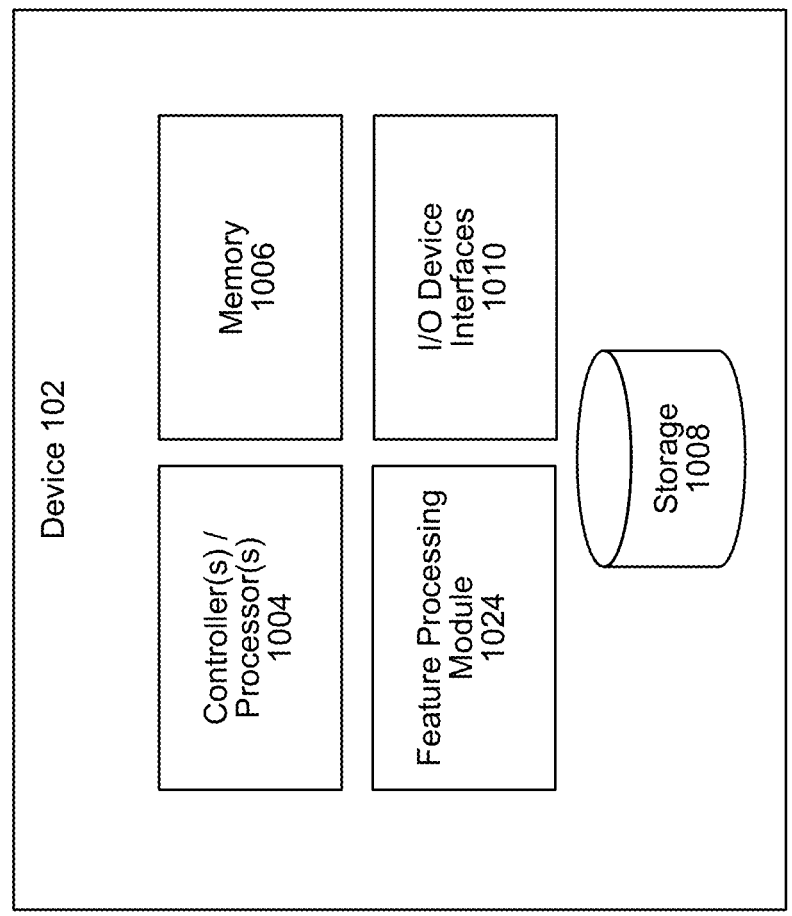

HARMONIC FEATURE PROCESSING FOR REDUCING NOISE

CROSS-REFERENCE TO RELATED APPLICATION DATA

This application is a continuation of and claims the benefit of U.S. patent application Ser. No. 15/016,801, entitled "Harmonic Feature Processing For Reducing Noise," filed Feb. 5, 2016, which claims priority to U.S. Provisional Patent Application Ser. No. 62/112,824, entitled "Harmonic Sectioning," filed on Feb. 6, 2015, and U.S. Provisional Patent Application Ser. No. 62/112,806, entitled "Lateral Excitation Smoothing," filed Feb. 6, 2015, all of which are incorporated herein by reference.

BACKGROUND

A wide variety of signal processing techniques may be performed to improve and/or process signals. The signal processing techniques may reduce or account for noise to isolate signals.

BRIEF DESCRIPTION OF DRAWINGS

For a more complete understanding of the present disclosure, reference is now made to the following description taken in conjunction with the accompanying drawings.

FIGS. 4A-4B illustrate examples of data before and after reducing noise according to embodiments of the present disclosure.

FIG. 7 illustrates an example of performing lateral excitation smoothing according to embodiments of the present disclosure.

FIG. 10 is a block diagram conceptually illustrating example components of a system according to embodiments of the present disclosure.

DETAILED DESCRIPTION

Figure 1:
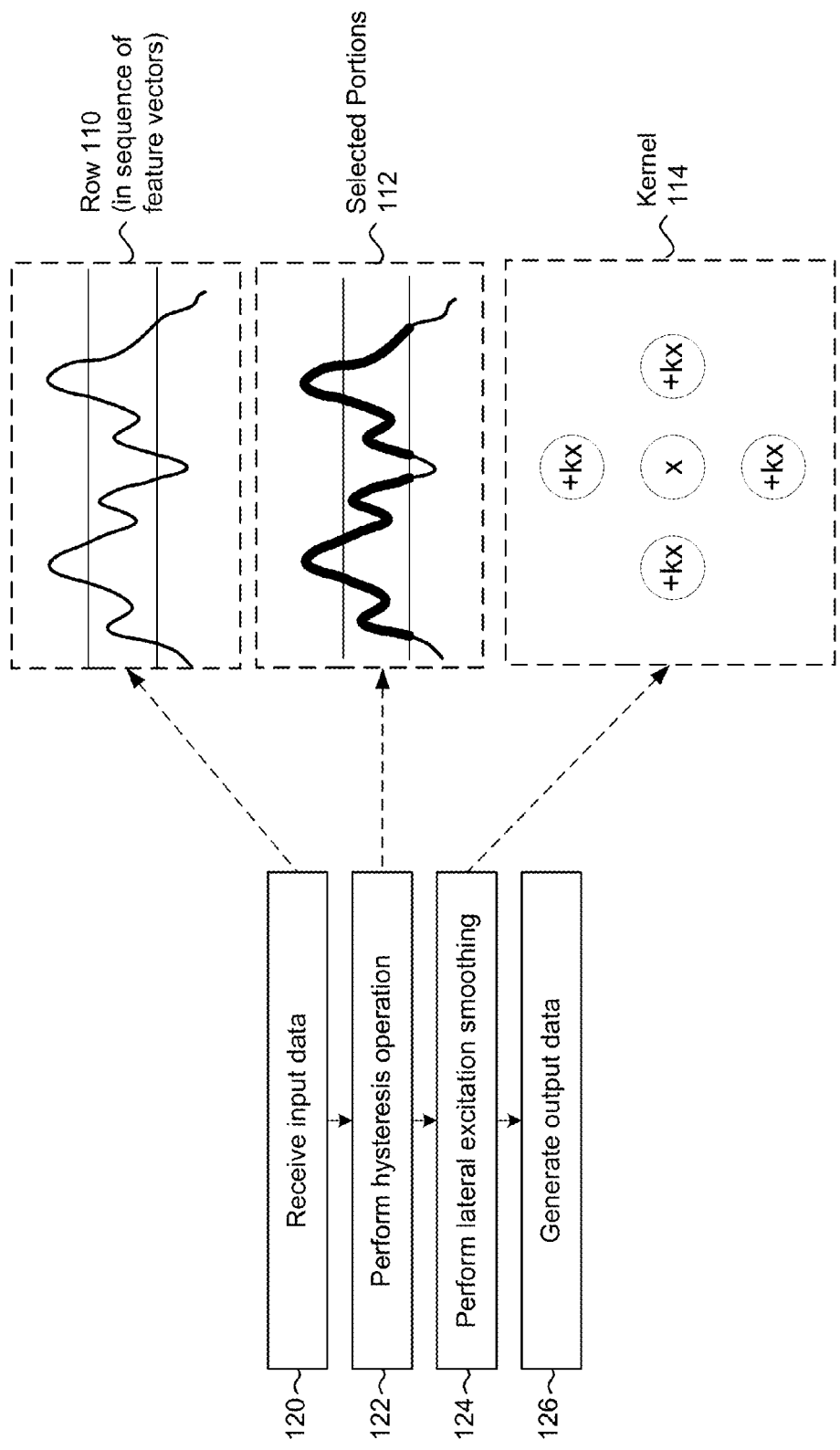
FIG. 1 illustrates an overview of a system for reducing noise in a signal according to embodiments of the present disclosure.

Audio signals may include a combination of signal (e.g., the desired portion, such as speech) and noise. When noise is relatively large in comparison to the signal, it may be difficult to identify the signal and more difficult to process the signal, such as by performing speech recognition or other operations on the signal. To reduce the noise, signal processing techniques may be used to isolate the signals from the noise.

Offered is an improved noise reduction system and method. The system may reduce noise and/or reconstruct a signal with reduced noise by performing a hysteresis operation and/or a lateral excitation smoothing process on a signal, such as an audio signal. For example, an audio signal may be represented as a sequence of feature vectors, such as computing a feature vector on successive portions of the signal (e.g., frames) spaced on a regular interval, such as every 10 milliseconds. In some implementations, a feature vector may represent the corresponding portion of the signal across different frequencies, such as a vector of mel-frequency cepstral coefficients or harmonic amplitude features (described in greater detail below). Conceptually, each feature vector may be considered as a column, and concatenating a sequence of feature vectors may create a matrix, which may be referred to as a feature matrix, where each column of the matrix corresponds to a feature vector. Determining features of harmonic signals is described in more detail in U.S. patent application Ser. No. 14/969,029, entitled "Determining features of harmonic signals," filed on Dec. 15, 2015, in the name of David C. Bradley, which is herein incorporated by reference in its entirety.

Rows of the feature matrix may be processed. For example, where the feature vectors are harmonic amplitude features, each row of the feature matrix may represent the amplitude of a harmonic of the signal over time. For a row of the feature matrix, it may be desired to reduce noise. For some portions of a row, the amplitude of the harmonic may be high relative to the noise. Since the signal-to-noise ratio is high, no changes may be made to those portion of the row. For other portions of the row, the harmonic may not be present at all or the amplitude of the harmonic may be low relative to the noise. Since the signal-to-noise ratio is low, these portions of the row may be modified to reduce the noise in the signal. A hysteresis operation may be performed to identify portions of the row where the signal-to-noise ratio is low, and these portions may be modified (e.g., setting the values to zero) to reduce the noise in the row.

After performing the hysteresis operation on the rows of the feature matrix, the system may perform a lateral excitation smoothing process to further modify the feature matrix to reduce noise. For example, the system may iteratively perform a spreading technique using a kernel, to spread a value of a data point in in the feature matrix to neighboring data points in the feature matrix. As a result of performing the lateral excitation smoothing process, portions of the feature matrix corresponding to a high signal-to-noise ratio may be maintained while other portions corresponding to a low signal-to-noise ratio may be reduced.

FIG. 1 illustrates an overview of a system for implementing embodiments of the disclosure. As illustrated in FIG. 1, the system may receive (120) input data. The input data may include audio data in the form of an audio signal, a sequence of feature vectors, a feature matrix, or another transformation, as discussed in greater detail below. The device 102 may reduce the amount noise to improve subsequent processing of the input data.

Where the received input data, is not in the form of a sequence of feature vectors or a feature matrix, the input data may be processed to create a sequence of feature vectors or feature matrix. For example, where the input data is an audio signal, the input data may be processed to create a sequence of feature vectors, wherein an individual feature vector may be computed from a portion of an audio signal (e.g., a 25 ms time window corresponding to an audio frame). The feature vector may represent the portion of the audio signal as a function of frequency. Where the received input data is a sequence of feature vectors, the input data may be processed to create a feature matrix. A sequence of feature vectors need not be explicitly transformed into a feature matrix, and instead the sequence of feature vectors may be accessed using a similar indexing scheme as if the feature vectors were combined into a matrix. For example, a column index may select a feature vector, and a row index may select an element of the selected feature vector. For clarity of presentation, the following description refers to processing a feature matrix, but the same processing may be performed on a sequence of feature vectors. For example, the $k^{th}$ row of the feature matrix may be processed as a row vector created from the $k^{th}$ element of each of the feature vectors.

The rows of the feature matrix may be processed to reduce noise. For example, a row of the feature matrix may comprise element k of each column (e.g., feature vector) of the feature matrix. For example, where the feature matrix is created using harmonic amplitude features, each row may correspond to a harmonic of speech in an audio signal. The input data may be represented as one-dimensional data, such as a sequence of single value data points. For example, the input data may include audio speech data, audio data, radar data or any one-dimensional data waveform. In some examples, the device 102 may receive two-dimensional data (for example, a spectrogram or an image) and the device 102 may identify one-dimensional cross sections of the data to analyze and/or may process in two dimensions. Thus, the input data may be two-dimensional without departing from the present disclosure. Further, the input data may be associated with a time domain or a frequency domain without departing from the present disclosure.

The device 102 may perform (122) a hysteresis operation. For example, the device 102 may select a row 110 in a sequence of feature vectors and may determine thresholds associated with the row 110 and/or the input data. To illustrate an example, the device 102 may determine noise characteristics (e.g., mean and standard deviation) associated with the individual row in the sequence of feature vectors, with a group of rows or with the input data in its entirety. The thresholds may include a low threshold and a high threshold, which may be determined using the mean and the standard deviation of the noise. For example, the low threshold may be one standard deviation above the mean and the high threshold may be two standard deviations above the mean.

The device 102 may set all data points to a first state and may select portions of the row 110, such as selected portions 112, to be associated with a second state. The device 102 may modify or discard unselected portions of the row (e.g., data points that remain associated with the first state). For example, the device 102 may determine a continuous sequence of data points in the row that are above the low threshold and include at least one data point above the high threshold and may associate the continuous sequence of data points with the second state. Thus, sequences of data points that are below the low threshold and/or that don't rise above the high threshold are not selected (e.g., remain associated with the first state) and are therefore modified or discarded (e.g., values of the unselected portions are modified or set to a fixed value, such as zero).

After modifying or discarding the unselected portions, the device 102 may perform (124) lateral excitation smoothing on the modified data using kernel 114. For example, the device 102 may determine a list of coordinates and corresponding values associated with the coordinates, may generate a random order (or pseudo-random order) of the list of coordinates and may apply a spreading technique to each coordinate based on the random order. The spreading technique, as illustrated by kernel 114, may include determining a center value (e.g., x) of a data point in a center of the kernel 114, determining a scale factor (e.g., k), determining a spread value (e.g., k*x) and adding the spread value to neighboring data points in the kernel 114. In some examples, the device 102 may normalize the values of data points in the kernel 114 after performing the spreading technique.

By iteratively performing the spreading technique to each interior coordinate (e.g., ignoring coordinates along a perimeter) based on the random order, the device 102 may remove data points likely attributed to noise while maintaining data points associated with a signal. In some examples, the device 102 may perform the lateral excitation smoothing process a number of times for each coordinate, such as generating the random order a plurality of times (e.g., five to ten times).

After performing the lateral excitation smoothing process, the device 102 may generate (126) output data, such as an output feature matrix where the noise has reduced noise relative to the noise in the input feature matrix. An audio signal may be reconstructed from the output feature matrix. For example, existing reconstruction techniques may be used to generate an audio signal from columns of the feature matrix (e.g., techniques for generating an audio signal from mel-frequency cepstral coefficients or from harmonic amplitude vectors). Reconstruction of signals is described in more detail in U.S. patent application Ser. No. 13/205,492, entitled "Systems and Methods for Reconstructing an Audio Signal from Transformed Audio Information," filed on Aug. 8, 2011, in the name of David C. Bradley et al., which is herein incorporated by reference in its entirety. The reconstructed audio signal may be presented to a user or may be used to perform any other processing that may be performed on an audio signal, such as, speech recognition, word spotting, speaker verification, or speaker identification.

In some implementations, the device 102 may perform only one of (122) hysteresis and (124) lateral excitation smoothing. For example, the device 102 may receive (120) input data, perform (122) a hysteresis operation, and generate (126) output data.

Figure 2:
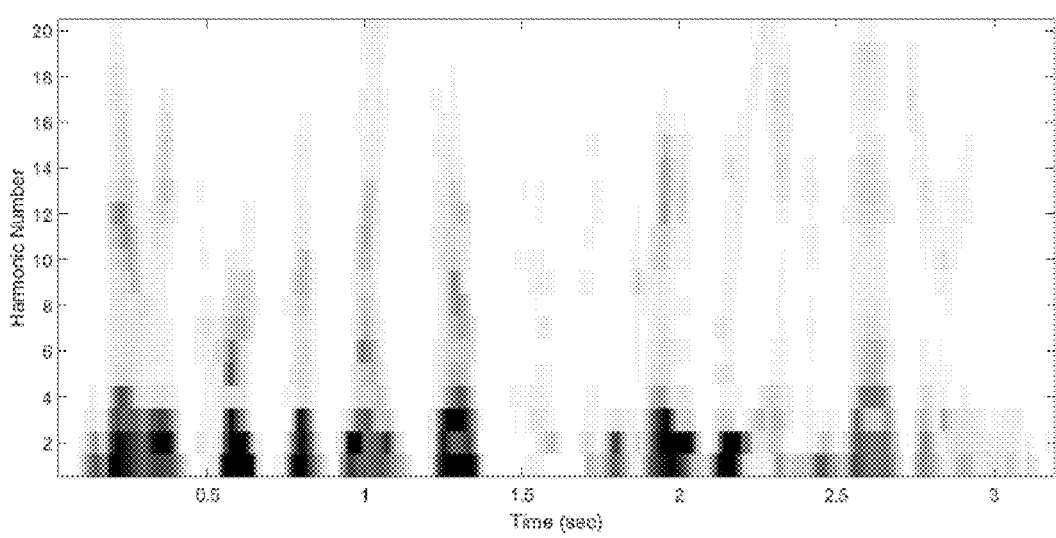
FIG. 2 illustrates an example of data on which to reduce noise.

As discussed above, the device 102 may process individual horizontal rows of a feature matrix. To reduce noise in the feature matrix, the device 102 may process an individual row by performing hysteresis to determine where the harmonic is present (e.g., amplitude above a threshold) and where the harmonic is not present (e.g., amplitude below the threshold). FIG. 2 illustrates a feature matrix 200 comprising feature vectors representing the audio data using harmonic amplitude features, which is described in more detail in U.S. patent application Ser. No. 14/969,029, incorporated above. While the illustrated feature matrix 200 represents audio data using harmonic amplitude features, the disclosure is not limited thereto and hysteresis may be performed on other feature matrices that include feature vectors representing a signal using Mel-frequency cepstral coefficients (MLFCCs or MFCCs), perceptual linear prediction (PLP) cepstral coefficients or the like.

Figure 3A:
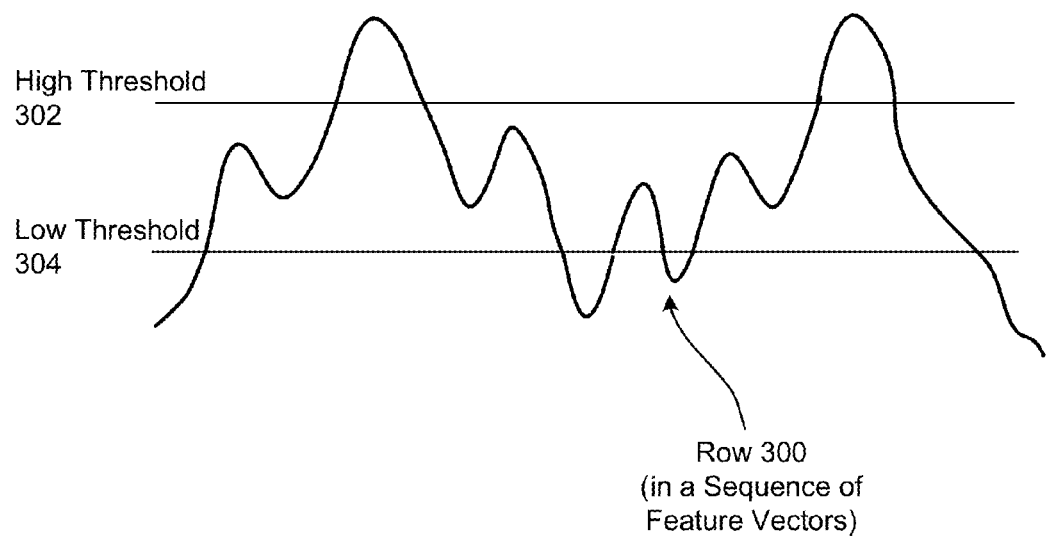
FIGS. 3A-3D illustrate examples of performing a hysteresis operation according to embodiments of the present disclosure.

FIGS. 3A-3D illustrate examples of performing a hysteresis operation according to embodiments of the present disclosure. As illustrated in FIG. 3A, a row 300 in a sequence of feature vectors may have varying amplitudes over time. To determine which portions of the row 300 corresponds to a harmonic that is present (e.g., amplitude of the harmonic is above a threshold and thus corresponds to a sound instead of noise), the device 102 may compare elements of the row 300 to a high threshold 302 and a low threshold 304. The device 102 may determine the high threshold 302 and the low threshold 304 based on noise characteristics associated with noise present in the row 300. For example, the device 102 may determine a mean and standard deviation of the background noise and may use the standard deviation to determine the high threshold 302 (e.g., two standard deviations above the mean) and the low threshold 304 (e.g., one standard deviation above the mean).

Statistically, it may be unlikely that noise exceeds the high threshold 302 and therefore any signal exceeding the high threshold 302 may be assumed to correspond to the harmonic being present and is therefore caused by a sound. However, if the device 102 determines when the harmonic is present using only the high threshold 302, the device 102 may determine highly fragmented harmonics as the harmonic is not indicated as being present during portions of the signal below the high threshold 302. For example, because the harmonics contain noise, they have a certain jitter (e.g., up and down variations in amplitude) and as the harmonic nears the high threshold 302, the jitter may cause the harmonic to swing above and below the high threshold 302, creating a series of pulses instead of a consistent signal.

To avoid generating highly fragmented signals while still reducing noise, the device 102 may perform a hysteresis operation on the row 300. The hysteresis operation may use two rules: 1) a harmonic is present once it rises above the high threshold 302, and 2) a harmonic remains present until it falls below the low threshold 304. The device 102 may perform the hysteresis operation twice, once going left to right (e.g., advancing in time) and once going right to left (e.g., reversing in time). The hysteresis operation is based on an assumption that noise values may occasionally rise above the low threshold 304 but rarely remain above the low threshold 304 for a significant period of time, whereas an actual signal may remain above the low threshold 304 for a majority of the time and may reach the high threshold 302 at least once. After performing the hysteresis operation to select portions of the row 300, the device 102 may maintain values of the selected portions of the row 300 while modifying or discarding unselected portions of the row 300 (e.g., setting values of the unselected portion to a fixed value, such as zero).

Figure 3B:
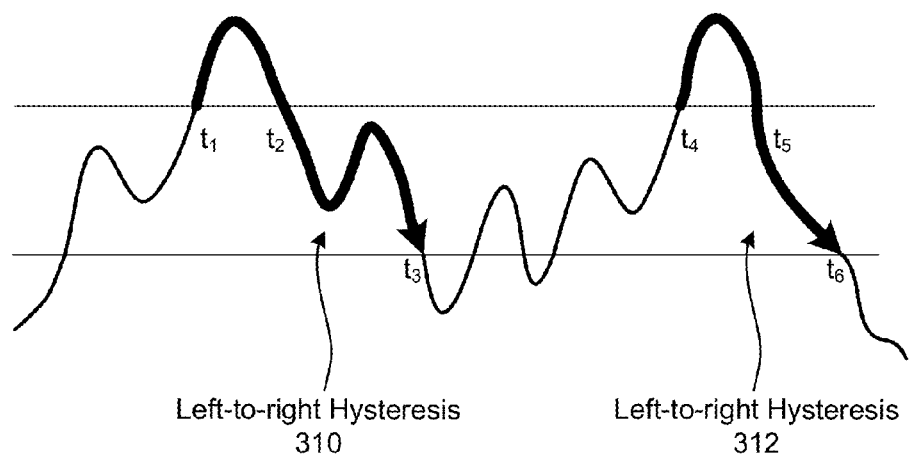

FIG. 3B illustrates the device 102 performing a left-to-right hysteresis operation. As illustrated in FIG. 3B, the device 102 may determine that the row 300 crosses the high threshold 302 at a first time (e.g., $t_1$) and a second time (e.g., $t_2$) and then drops below the low threshold 304 at a third time (e.g., $t_3$). While the row 300 is only above the high threshold 302 between the first time and the second time, the device 102 may select the row 300 from the first time to the third time, as indicated by left-to-right hysteresis 310. Similarly, the device 102 may determine that the row 300 crosses the high threshold 302 at a fourth time (e.g., $t_4$) and a fifth time (e.g., $t_5$) and then drops below the low threshold 304 at a sixth time (e.g., $t_6$). While the row 300 is only above the high threshold 302 between the fourth time and the fifth time, the device 102 may select the row 300 from the fourth time to the sixth time, as indicated by left-to-right hysteresis 312.

Figure 3C:
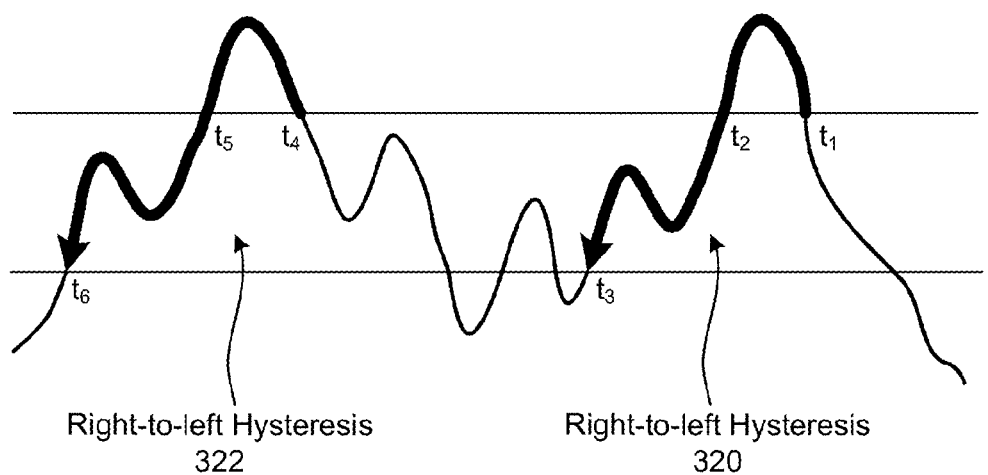

FIG. 3C illustrates the device 102 performing a right-to-left hysteresis operation. As illustrated in FIG. 3C, the device 102 may determine that the row 300 crosses the high threshold 302 at a first time (e.g., $t_1$) and a second time (e.g., $t_2$) and then drops below the low threshold 304 at a third time (e.g., $t_3$). While the row 300 is only above the high threshold 302 between the first time and the second time, the device 102 may select the row 300 from the first time to the third time, as indicated by right-to-left hysteresis 320. Similarly, the device 102 may determine that the row 300 crosses the high threshold 302 at a fourth time (e.g., $t_4$) and a fifth time (e.g., $t_5$) and then drops below the low threshold 304 at a sixth time (e.g., $t_6$). While the row 300 is only above the high threshold 302 between the fourth time and the fifth time, the device 102 may select the row 300 from the fourth time to the sixth time, as indicated by right-to-left hysteresis 322.

Figure 3D:
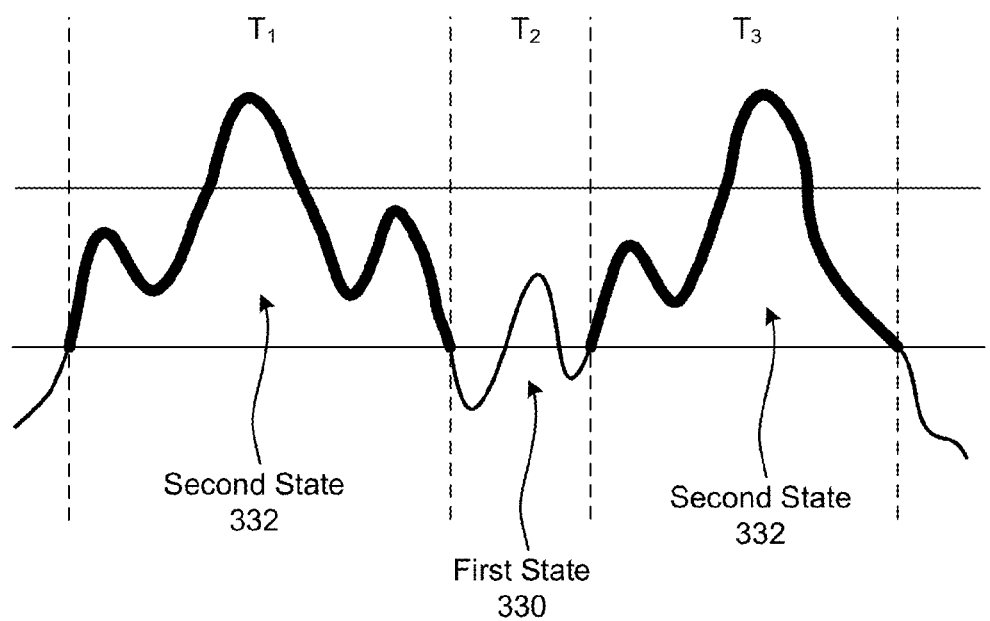

FIG. 3D illustrates the results of the hysteresis operation. In some examples, the device 102 may first initialize all data points in the row 300 to a first state 330 prior to performing the hysteresis operation and may change the selected data points to a second state 332 during the hysteresis operation. As illustrated in FIG. 3D, data points associated with the left-to-right hysteresis 310 and right-to-left hysteresis 320 are combined in a first time period (e.g., $T_1$) and associated with the second state 332, indicating that the harmonic is present during the first time period. Similarly, data points associated with left-to-right hysteresis 312 and right-to-left hysteresis 322 are combined in a third time period (e.g., $T_3$) and associated with the second state 332, indicating that the harmonic is present during the third time period. Thus, the device 102 selects series of data points from the row 300 that are above the low threshold 304 and cross the high threshold 302 at least once and associates the series of data points with the second state 332.

In contrast, data points that weren't selected during the hysteresis operation, such as during a second time period (e.g., $T_2$) that includes a series of data points that cross the low threshold 304 but do not go above the high threshold 302, remain in the first state 330 that indicates that the harmonic is not present. After performing the hysteresis operation, the device 102 may modify or discard values of data points that remain in the first state 330 and are not associated with the second state 332. For example, the device 102 may set values of data points that remain in the first state 330 to a fixed value, such as zero.

As a result of performing the hysteresis operation, noise and/or weak signals included in the row 300 may be reduced as the row 300 will include data points having a value above the low threshold 304 or a value of zero. The device 102 may repeat the hysteresis operation on multiple rows in the sequence of feature vectors, for example for each harmonic (e.g., row) of the feature matrix 200. FIGS. 4A-4B illustrate examples of data before and after reducing noise according to embodiments of the present disclosure. For example, FIG. 4A illustrates an example of a first spectrogram 400 of the original signal, which corresponds to input data. The first spectrogram 400 represents data points as a function of time and frequency and illustrates that the original signal includes a lot of noise. In contrast, FIG. 4B illustrates an example of a second spectrogram 450 of a reconstructed signal, where the reconstructed signal was created from a feature matrix after the hysteresis operation was performed on each of the rows to reduce noise. As illustrated in FIG. 4B, the reconstructed signal has less noise than the original signal. While the first spectrogram 400 and the second spectrogram 450 are included to illustrate an example of reduction in noise as a result of performing the hysteresis operation, the first spectrogram 400 and the second spectrogram 450 may not themselves be part of the hysteresis operation or other steps in the process.

Figure 5A:
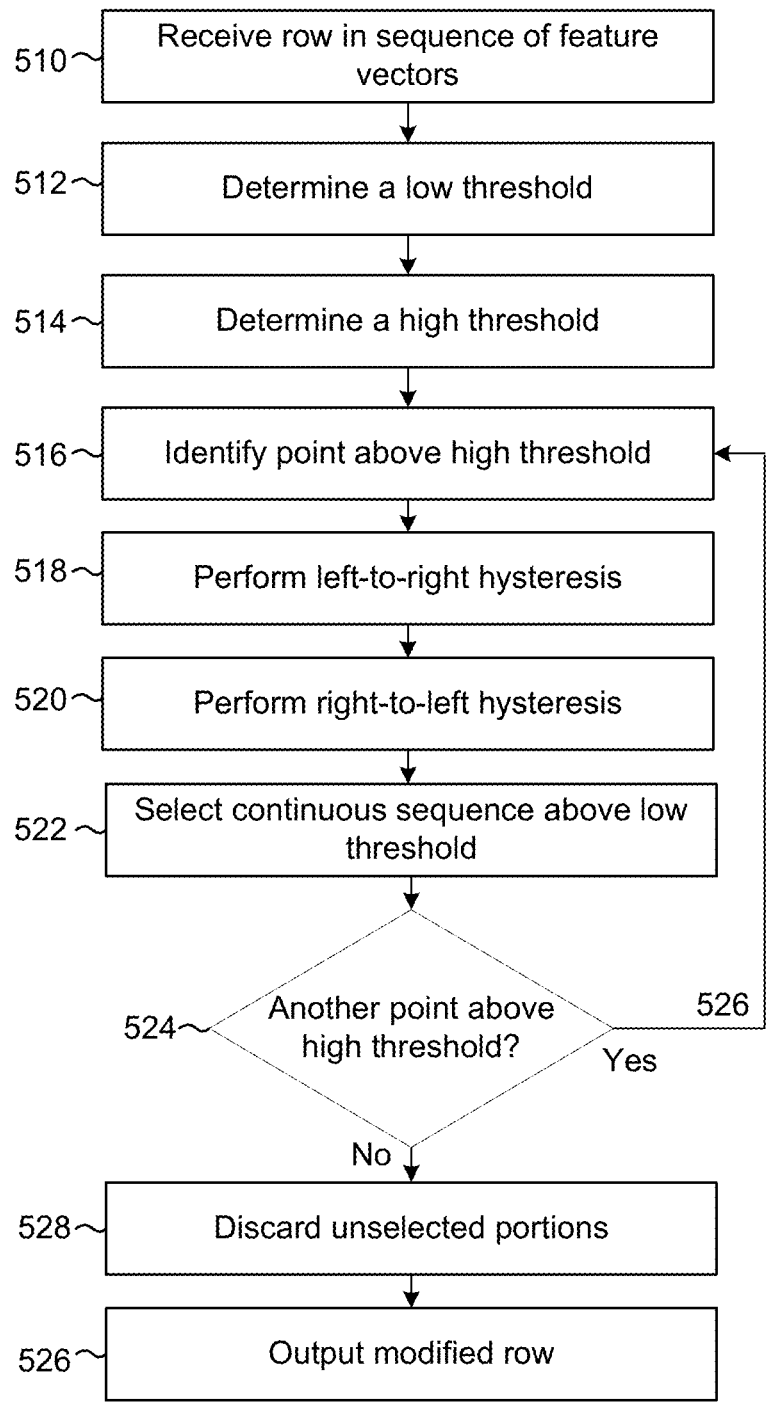
FIGS. 5A-5B are flowcharts conceptually illustrating example methods of performing hysteresis operations according to embodiments of the present disclosure.
Figure 5B:
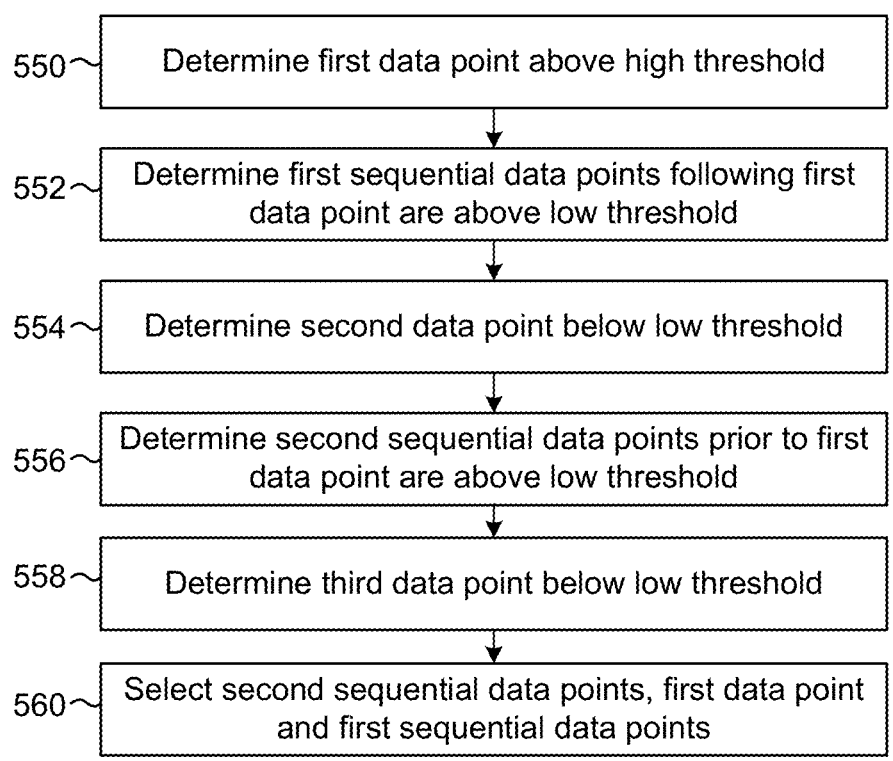

FIGS. 5A-5B are flowcharts conceptually illustrating example methods of performing hysteresis operations according to embodiments of the present disclosure. As illustrated in FIG. 5A, the device 102 may receive (510) a row in a sequence of feature vectors, which may correspond to a harmonic in a feature matrix and/or a series of data points. The device 102 may determine (512) a low threshold and determine (514) a high threshold. For example, the device 102 may determine characteristics of noise in the row and/or the input data, such as a mean and standard deviation associated with the noise, and the low threshold may be one standard deviation above the mean and the high threshold may be two standard deviations above the mean.

The device 102 may identify (516) a point above the high threshold and may perform (518) left-to-right hysteresis and perform (520) right-to-left hysteresis and select (522) a continuous sequence of data points above the low threshold. After selecting the continuous sequence of data points, the device 102 may determine (524) if there is another data point above the high threshold, and if so, may loop (526) to step 516 for the additional data point.

After performing left-to-right hysteresis and right-to-left hysteresis for every data point above the high threshold, the device 102 may modify or discard (528) unselected portions of the row. For example, the device 102 may set a value of the unselected portions to a fixed value, such as zero. The device 102 may output (526) a modified row with the modified values for the unselected portions.

FIG. 5B illustrates the hysteresis operation in more detail. As illustrated in FIG. 5B, the device 102 may determine (550) a first data point above the high threshold. The device 102 may determine (552) first sequential data points following the first data point that are above the low threshold and may determine (554) a second data point below the low threshold following the first sequential data points. The device 102 may determine (556) second sequential data points prior to the first data point that are above the low threshold and may determine (558) a third data point below the low threshold prior to the second sequential data points. The device 102 may then select (560) the second sequential data points, the first data point and the first sequential data points as corresponding to the harmonic being present.

While performing the hysteresis operation reduces noise included in an individual row of a feature matrix, the feature matrix may still include noise. To reduce the remaining noise, the device 102 may perform lateral excitation smoothing on data points in the feature matrix. The lateral excitation smoothing processes an x-y grid of data points and spreads individual values to neighboring data points. By performing the lateral excitation smoothing operation, isolated data points that are not well connected to signals may be removed, leaving desired signals.

Figure 6A:
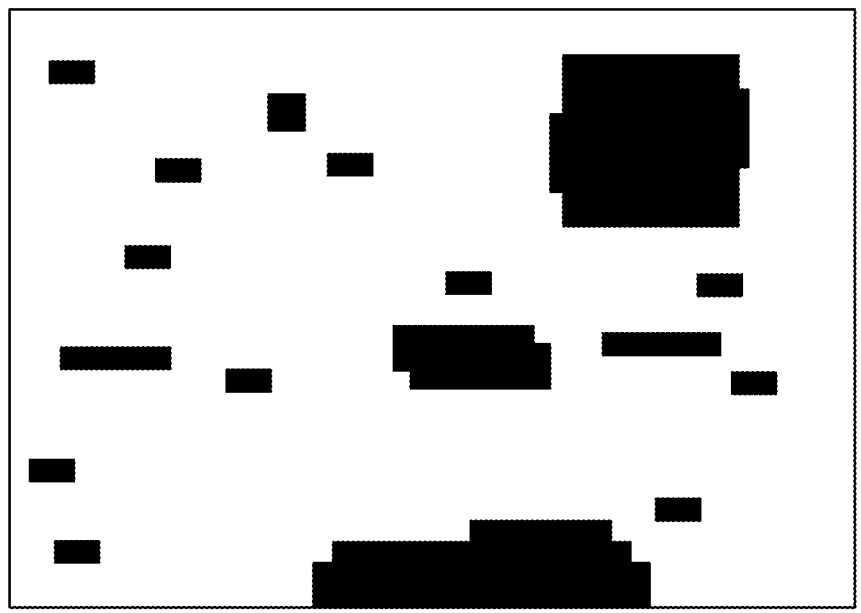
FIGS. 6A-6B illustrate examples of data before and after performing a lateral excitation smoothing process according to embodiments of the present disclosure.
Figure 6B:

FIGS. 6A-6B illustrates examples of a feature matrix before and after performing a lateral excitation smoothing process. FIG. 6A illustrates an input feature matrix 600, including isolated data points, whereas FIG. 6B illustrates an output feature matrix 650 that comprises data points associated with signals. As shown in FIG. 6B, the isolated data points are removed as a result of the lateral excitation smoothing process.

FIG. 7 illustrates an example of performing lateral excitation smoothing according to embodiments of the present disclosure. As illustrated in FIG. 7, the device 102 may perform lateral excitation smoothing on an X-Y plot 700 (e.g., horizontal and vertical plot of data points, such as a feature matrix or the like). To perform the smoothing, the device 102 may apply a spreading technique to individual data points in the X-Y plot 700. For example, the spreading technique may spread energy from a center data point to neighboring data points, as will be discussed below with regard to FIGS. 8A-8B. The device 102 may generate a list of coordinates for data points included in the X-Y plot 700, may determine individual values of the data points included in the X-Y plot 700 and may associate the values with corresponding coordinates. The device 102 may determine a random order (or pseudo-random order) of the coordinates and may apply the spreading technique to individual data points based on the random order. For example, the device 102 may apply the spreading technique to data point 702, then data point 704, then data point 706 and so on until the device 102 has applied the spreading technique to a majority/all of the data points included in the X-Y plot 700.

The device 102 may apply the spreading technique using the stored values and a scale factor to determine a percentage of a center value of a center data point to spread to neighboring data points. For example, the scale factor may be between zero and one, and in some examples the scale factor may be between 0.05 and 0.2. Thus, the device 102 may determine a value for each data point and multiply the value by the scale factor (e.g., 5% to 20%) to generate a spread value and add the spread value to neighboring data points. In some examples, the device 102 may perform the lateral excitation smoothing process a number of times, applying the spreading technique to each data point multiple times (e.g., between five and ten times). Additionally or alternatively, in some examples the device 102 may apply a normalization process to normalize the data points after applying the spreading technique, performing a lateral excitation smoothing process and/or performing multiple lateral excitation smoothing processes. As each spreading technique increases energy (e.g., adds the spread value to neighboring pixel values), the normalization process normalizes the data points so that there is an equal amount of energy before and after the spreading technique, as described below with regard to FIG. 9C.

Figure 8A:
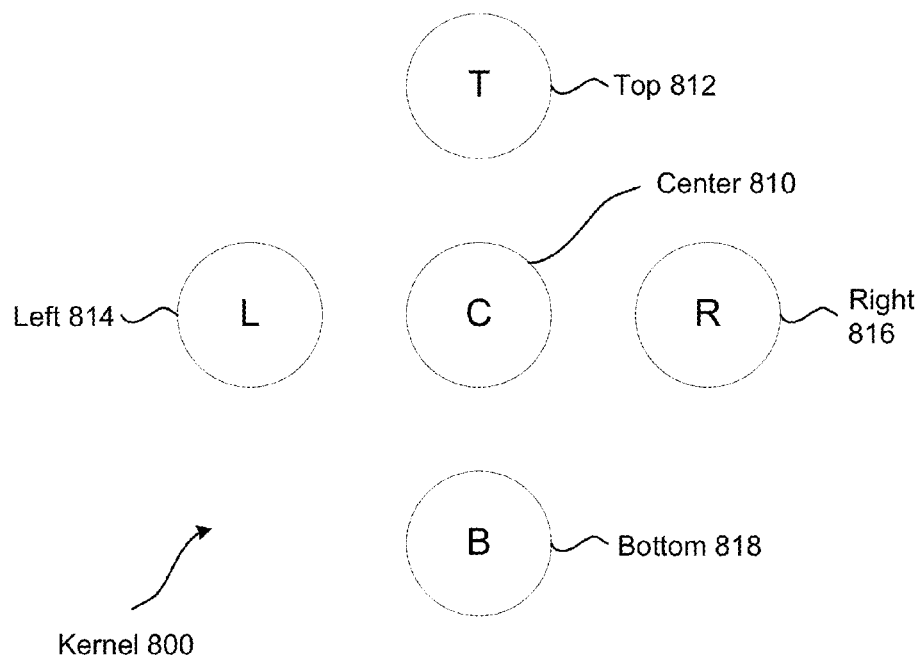
FIGS. 8A-8B illustrate examples of a lateral excitation smoothing process according to embodiments of the present disclosure.
Figure 8B:
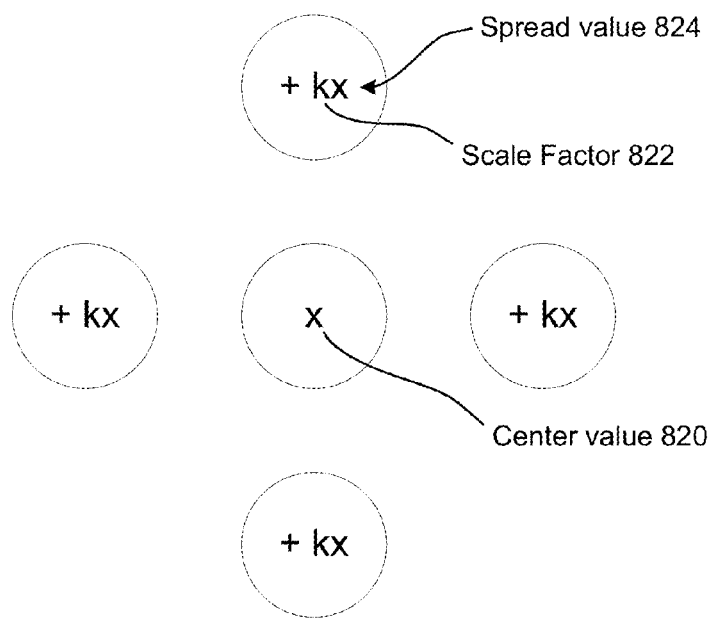

FIGS. 8A-8B illustrate examples of a lateral excitation smoothing process according to embodiments of the present disclosure. The device 102 may perform the lateral excitation smoothing using a kernel 800. One example of a kernel is illustrated in FIG. 8A. The kernel of FIG. 8A comprises a center data point 810, a top data point 812, a left data point 814, a right data point 816 and a bottom data point 818. For example, center data point 810 may be associated with a first feature vector (e.g., x=n) in a first row (e.g., y=j), left data point 814 may be in a second feature vector (e.g., x=n−1) in the first row (e.g., y=j), the right data point 816 may be in a third feature vector (e.g., x=n+1) in the first row (e.g., y=j), the top data point 812 may be in the first feature vector (e.g., x=n) in a second row (e.g., y=j+1) and the bottom data point 818 may be in the first feature vector (e.g., x=n) in a third row (e.g., y=j−1). A kernel need not include all of the data points in FIG. 8A and may include other data points.

To perform the spreading technique, the device 102 may determine a center value 820 (e.g., x) of the center data point 810. As illustrated in FIG. 8B, the device 102 may determine a scale factor 822 (e.g., k), may scale the center value 820 by the scale factor 822 to create a spread value 824 (e.g., k*x) and may add the spread value 824 to the neighboring data points. While FIGS. 8A-8B illustrate the neighboring data points including contiguously adjacent data points (e.g., element j in a previous feature vector, element j in a subsequent feature vector, element j+1 in the same feature vector and element j−1 in the same feature vector), the disclosure is not limited thereto. Instead, the device 102 may determine neighboring data points to include non-contiguous adjacent data points or data points within a range of the center data point. For example, the device 102 may include adjacent pixels within three elements of the center data point, including elements j−3 to elements j+3 for feature vector n−3 to feature vector n+3, without departing from the present disclosure.

To illustrate an example, the data points may have the following beginning values:

$$\begin{matrix} & 1 & \\ 1 & 4 & 1 \\ & 1 & \end{matrix}$$

Thus, the center value 820 may be 4, whereas the neighboring data points may have a value of 1. Therefore, the device 102 may determine a scale factor 822 (e.g., 0.25), may determine a spread value 824 (e.g., 0.25*4=1) and may add the spread value 824 (e.g., 1) to the neighboring data points to generate the following un-normalized values:

$$\begin{matrix} & 2 & \\ 2 & 4 & 2 \\ & 2 & \end{matrix}$$

To normalize the data, the device 102 may scale the un-normalized values so that a sum of the values remains constant before and after applying the spreading technique. For example, a first sum of the beginning values was equal to 8 (e.g., 4+1+1+1+1=8) whereas a second sum of the un-normalized values was equal to 12 (e.g., 4+2+2+2+2=12). To normalize the values, the device 102 may multiply each of the un-normalized values (including the center value) by a normalization factor, which is the first sum divided by the second sum (e.g., 8/12). For example, the values may be normalized from a value of 2 to a value of 1.33 (e.g., 2*8/12=1.33) and from a value of 4 to a value of 2.67 (e.g., 4*8/12=2.67), for a total sum of 8 (e.g., 2.67+1.33+1.33+1.33+1.33=8), as illustrated by the following normalized values:

$$\begin{matrix} & 1.33 & \\ 1.33 & 2.67 & 1.33 \\ & 1.33 & \end{matrix}$$

Other normalization schemes are also possible. For example, the spread value may be subtracted from the center data point for each time it was added to a neighboring data point.

Figure 9A:
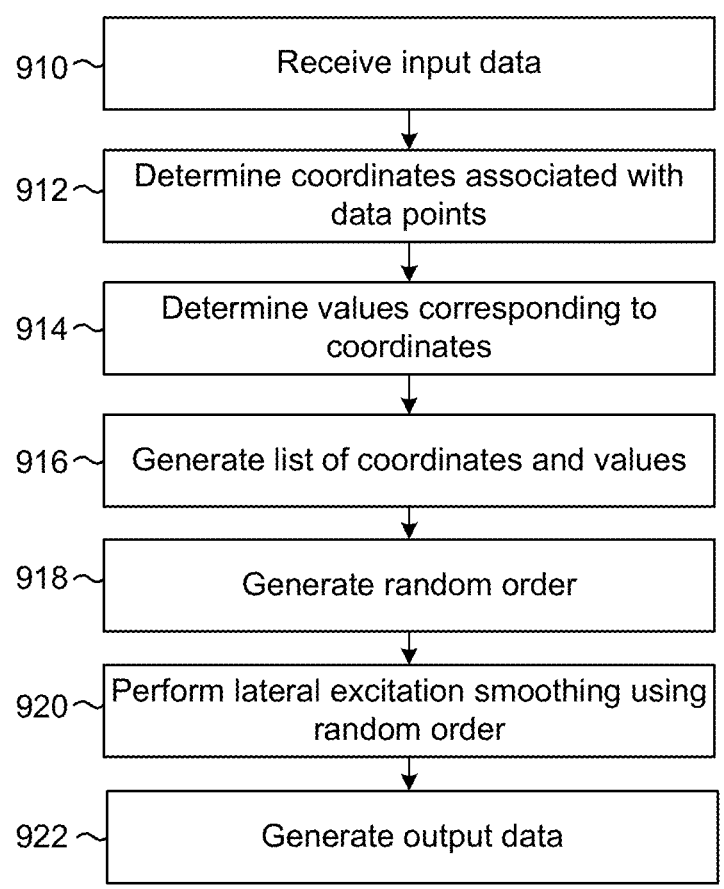
FIGS. 9A-9C are flowcharts conceptually illustrating example methods of performing lateral excitation smoothing according to embodiments of the present disclosure.
Figure 9B:
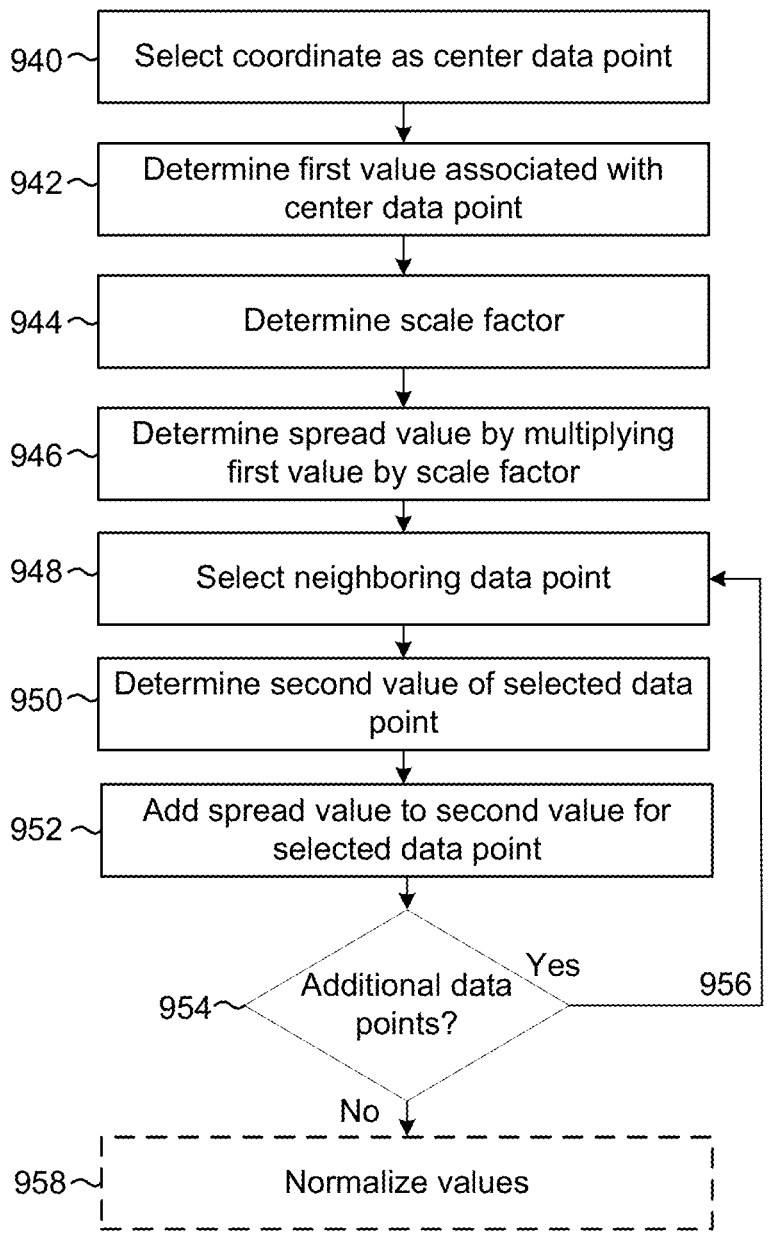
Figure 9C:
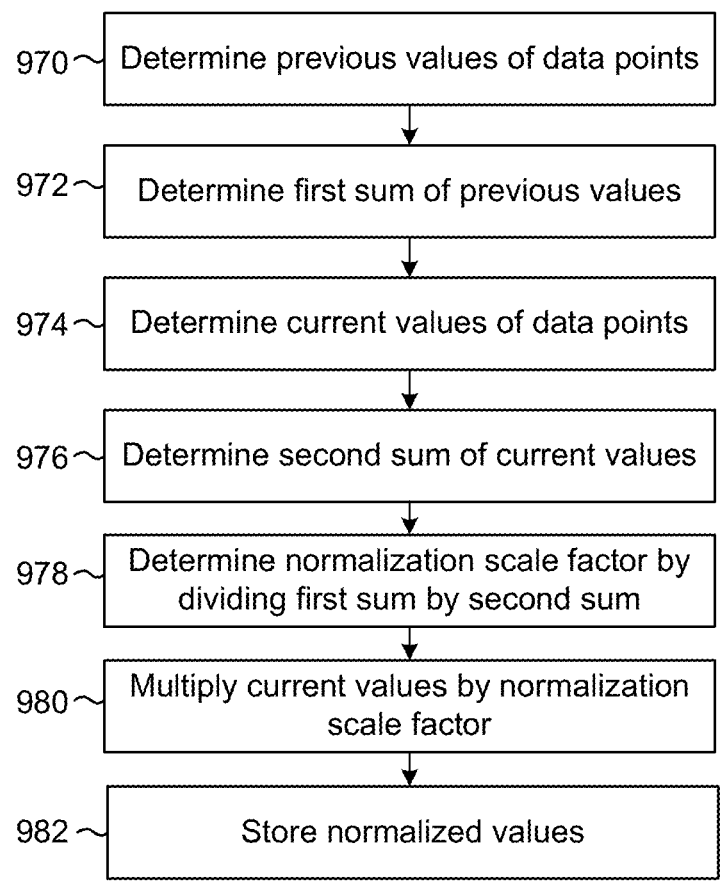

FIGS. 9A-9C are flowcharts conceptually illustrating example methods of performing lateral excitation smoothing according to embodiments of the present disclosure. As illustrated in FIG. 9A, the device 102 may receive (910) input data, may determine (912) coordinates associated with individual data points in the input data, may determine (914) values corresponding to each of the coordinates and may generate (916) a list of the coordinates and corresponding values. The device 102 may then generate (918) a random order of the coordinates (or pseudo-random order), perform (920) lateral excitation smoothing using the random order (e.g., applying a spreading technique to individual data points according to the random order) and generate (922) output data. As discussed above, the device 102 may per- form steps 912-922 a number of times in order to reduce noise (e.g., isolated data points) in the input data.

FIG. 9B illustrates the lateral excitation smoothing process in more detail. As illustrated in FIG. 9B, the device 102 may select (940) a coordinate as a center data point for a kernel (e.g., using the random order generated in step 918) and determine (942) a first value associated with the center data point. The device 102 may determine (944) a scale factor, such as a number between zero and one, and may determine (946) a spread value by multiplying the first value by the scale factor. The device 102 may then select (948) a neighboring data point, determine (950) a second value of the selected data point and add (952) the spread value to the second value for the selected data point. The device 102 may determine (954) if there are additional neighboring data points and, if so, may loop (956) to step 948 to perform steps 948-952 for the additional neighboring data point. If the device 102 determines that there are not additional neighboring data points, the device 102 may optionally normalize (958) values, as discussed below with regard to FIG. 9C.

As illustrated in FIG. 9C, the device 102 may determine (970) previous values of data points in a kernel and may determine (972) a first sum of the previous values. The device 102 may determine (974) current values of the data points and may determine (976) a second sum of the current values. The device 102 may determine (978) a normalization scale factor by dividing the first sum by the second sum, may multiply (980) current values by the normalization scale factor and may store (982) the normalized values.

FIG. 10 illustrates a block diagram conceptually illustrating example components of a system 100 including a device 102. Other components not illustrated may also be included in the device 102. In operation, the system 100 may include computer-readable and computer-executable instructions that reside in storage 1008 on the device 102. The device 102 may be an electronic device capable of determining characteristics of noise included in data. Examples of electronic devices may include computers (e.g., a desktop, a laptop, a server or the like), portable devices (e.g., a smart phone, tablet or the like), media devices (e.g., televisions, video game consoles, set-top boxes, headless devices or the like) or the like. The device 102 may also be a component of any of the abovementioned devices or systems.

As illustrated in FIG. 10, the device 102 may include an address/data bus (not shown) for conveying data among components of the device 102. Each component within the device 102 may also be directly connected to other components in addition to (or instead of) being connected to other components across the bus.

The device 102 may include one or more controllers/processors 1004 comprising one-or-more central processing units (CPUs) for processing data and computer-readable instructions and a memory 1006 for storing data and instructions. The memory 1006 may include volatile random access memory (RAM), non-volatile read only memory (ROM), non-volatile magnetoresistive (MRAM) and/or other types of memory. The device 102 may also include a data storage component 1008 for storing data and processor-executable instructions. The data storage component 1008 may include one or more non-volatile storage types such as magnetic storage, optical storage, solid-state storage, etc. The device 102 may also be connected to a removable or external non-volatile memory and/or storage (such as a removable memory card, memory key drive, networked storage, etc.) through the input/output device interfaces 1010.

The device 102 includes input/output device interfaces 1010. A variety of components may be connected to the device 102 through the input/output device interfaces 1010. The input/output device interfaces 1010 may be configured to operate with a network, for example a wireless local area network (WLAN) (such as WiFi), Bluetooth, Zigbee and/or wireless networks, such as a Long Term Evolution (LTE) network, WiMAX network, 3G network, etc. The network may include a local or private network or may include a wide network such as the internet. Devices may be connected to the network through either wired or wireless connections.

The input/output device interfaces 1010 may also include an interface for an external peripheral device connection such as universal serial bus (USB), FireWire, Thunderbolt, Ethernet port or other connection protocol that may connect to networks. The input/output device interfaces 1010 may also include a connection to an antenna (not shown) to connect one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102 further includes a feature processing module 1024, which may comprise processor-executable instructions stored in storage 1008 to be executed by controller(s)/processor(s) 1004 (e.g., software, firmware), hardware, or some combination thereof. For example, components of the feature processing module 1024 may be part of a software application running in the foreground and/or background on the device 102. The feature processing module 1024 may control the device 102 as discussed above, for example with regard to FIGS. 1, 5A-5B and/or 9A-9C. Some or all of the controllers/modules of the feature processing module 1024 may be executable instructions that may be embedded in hardware or firmware in addition to, or instead of, software. In one embodiment, the computing device 102 may operate using an Android® operating system (such as Android® 4.3 Jelly Bean, Android® 4.4 KitKat or the like).

Executable computer instructions for operating the device 102 and its various components may be executed by the controller(s)/processor(s) 1004, using the memory 1006 as temporary "working" storage at runtime. The executable instructions may be stored in a non-transitory manner in non-volatile memory 1006, storage 1008, or an external device. Alternatively, some or all of the executable instructions may be embedded in hardware or firmware in addition to or instead of software.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for reducing noise in an audio signal, the method comprising:
    obtaining a sequence of feature vectors from an audio signal, wherein each feature vector of the sequence is computed from a portion of the audio signal and represents the portion of the audio signal as a function of frequency;
    modifying the sequence of feature vectors using a spread value by:
        obtaining a scale factor between 0 and 1,
        selecting element j of a first feature vector,
        determining the spread value by multiplying the scale factor by a value of the element j of the first feature vector, and
        adding the spread value to (i) element j+1 of the first feature vector, (ii) element j−1 of the first feature vector, (iii) element j of a feature vector subsequent to the first feature vector, and (iv) element j of a feature vector antecedent to the first feature vector; and
    generating output data including the sequence of feature vectors.

2. The computer-implemented method of claim 1, further comprising, after generating the output data:
    performing one or more of (i) reconstructing an audio signal from the sequence of feature vectors, (ii) performing speech recognition using the sequence of feature vectors, or (iii) performing speaker verification or speaker identification using the sequence of feature vectors.

3. The computer-implemented method of claim 1, wherein computing a sequence of feature vectors comprises computing a first feature vector from a first portion of the audio signal and computing the first feature vector comprises:
    estimating a pitch of the first portion of the audio signal; and
    determining a plurality of harmonic amplitudes of the first portion of the audio signal using the estimated pitch,
    wherein the first feature vector comprises the plurality of harmonic amplitudes.

4. The computer-implemented method of claim 1, wherein the element j of the first feature vector is selected randomly or pseudo-randomly.

5. The computer-implemented method of claim 1, further comprising adding the spread value to (i) element j+1 of a feature vector subsequent to the first feature vector, or (ii) element j of a feature vector after the subsequent feature vector.

6. The computer-implemented method of claim 1, wherein:
    performing a spreading operation for an element of a feature vector comprises computing a second spread value by multiplying a value of the element by the scale factor, and adding the second spread value to at least two adjacent elements, wherein the adjacent element may be in the feature vector or an adjacent feature vector;
    the method further comprises sequentially performing the spreading operation for a plurality of elements of a plurality of feature vectors.

7. The computer-implemented method of claim 1, the method comprising:
    performing a hysteresis operation on a row of the sequence of feature vectors.

8. The computer-implemented method of claim 7, wherein the hysteresis operation is performed before modifying the sequence of feature vectors using the spread value.

9. The computer-implemented method of claim 7, wherein performing the hysteresis operation comprises:
    processing the elements of the row in a first direction; and
    processing the elements of the row in a second direction.

10. A device comprising:
    at least one processor;
    a memory including instructions operable to be executed by the at least one processor to configure the device to:
        obtain a sequence of feature vectors from an audio signal, wherein each feature vector of the sequence is computed from a portion of the audio signal;
        modify the sequence of feature vectors using a spread value by:
            obtaining a scale factor between 0 and 1,
            selecting element j of a first feature vector,
            determining the spread value by multiplying the scale factor by a value of the element j of the first feature vector, and
            adding the spread value to at least two adjacent elements, wherein each of the two adjacent elements is at least one of (i) in an element adjacent to element j in the first feature vector or (ii) in a second feature vector adjacent to the first feature vector; and
        generate output data including the sequence of feature vectors.

11. The device of claim 10, wherein the instructions further configure the device to:
    perform one or more of (i) reconstructing an audio signal from the sequence of feature vectors, (ii) perform speech recognition using the sequence of feature vectors, or (iii) perform speaker verification or speaker identification using the sequence of feature vectors.

12. The device of claim 10, wherein the instructions further configure the device to:
    compute a first feature vector from a first portion of the audio signal, wherein computing the first feature vector comprises:
        estimating a pitch of the first portion of the audio signal; and
        determining a plurality of harmonic amplitudes of the first portion of the audio signal using the estimated pitch,
        wherein the first feature vector comprises the plurality of harmonic amplitudes.

13. The device of claim 10, wherein the element j of the first feature vector is selected randomly or pseudo-randomly.

14. The device of claim 10, wherein the instructions further configure the device to perform a hysteresis operation on a row of the sequence of feature vectors.

15. A non-transitory computer readable medium having stored thereon instructions to configure a computing device to:
    obtain a sequence of feature vectors from an audio signal, wherein each feature vector of the sequence is computed from a portion of the audio signal;
    modify the sequence of feature vectors using a spread value by:
        obtaining a scale factor between 0 and 1,
        selecting element j of a first feature vector,
        determining the spread value by multiplying the scale factor by a value of the element j of the first feature vector, and adding the spread value to at least two adjacent elements, wherein each of the two adjacent elements is at least one of (i) in an element adjacent to element j in the first feature vector or (ii) in a second feature vector adjacent to the first feature vector; and
generating output data including the sequence of feature vectors.

16. The non-transitory computer readable medium of claim 15, wherein the instructions configure the computing device to obtain the sequence of feature vectors by computing a first feature vector from a first portion of the audio signal and computing the first feature vector comprises:
estimating a pitch of the first portion of the audio signal; and
determining a plurality of harmonic amplitudes of the first portion of the audio signal using the estimated pitch,
wherein the first feature vector comprises the plurality of harmonic amplitudes.

17. The non-transitory computer readable medium of claim 15, wherein the instructions configure the computing device to:
perform a spreading operation for an element of a feature vector by computing a second spread value by multiplying a value of the element by the scale factor, and adding the second spread value to at least two adjacent elements, wherein the adjacent element may be in the feature vector or an adjacent feature vector; and
sequentially perform the spreading operation for a plurality of elements of a plurality of feature vectors.

18. The non-transitory computer readable medium of claim 15, wherein the instructions configure the computing device to perform a hysteresis operation on a row of the sequence of feature vectors.

19. The non-transitory computer readable medium of claim 15, wherein the element j of the first feature vector is selected randomly or pseudo-randomly.

20. The non-transitory computer readable medium of claim 15, wherein the instructions configure the computing device to perform a normalization step after adding the spread value to other elements.

* * * * *